US011883976B2

(12) United States Patent
Allen

(10) Patent No.: US 11,883,976 B2
(45) Date of Patent: Jan. 30, 2024

(54) WEDGE HOLDER FOR LOG SPLITTING

(71) Applicant: Harold Allen, Oxford, MS (US)

(72) Inventor: Harold Allen, Oxford, MS (US)

( * ) Notice: Subject to any disclaimer, the term of this patent is extended or adjusted under 35 U.S.C. 154(b) by 507 days.

(21) Appl. No.: 17/124,556

(22) Filed: Dec. 17, 2020

(65) Prior Publication Data

US 2021/0229312 A1 Jul. 29, 2021

Related U.S. Application Data

(60) Provisional application No. 62/995,319, filed on Jan. 23, 2020.

(51) Int. Cl.

*B27L 7/08* (2006.01)
*B27L 7/06* (2006.01)
*B27L 7/00* (2006.01)

(52) U.S. Cl.

CPC ................ *B27L 7/06* (2013.01); *B27L 7/005* (2013.01); *B27L 7/08* (2013.01)

(58) Field of Classification Search

CPC .... B27L 7/00; B27L 7/005; B27L 7/06; B27L 7/08; B25B 5/14; B23Q 3/002; B23Q 5/58; B23Q 9/0007; B23Q 9/0014; B23Q 9/02; B23Q 16/00; B26B 29/06

USPC ................................ 269/196, 217, 229, 231

See application file for complete search history.

(56) References Cited

U.S. PATENT DOCUMENTS

| | | | | |
|---|---|---|---|---|
| 4,081,008 A * | 3/1978 | Dilling | B27L 7/00 | 144/195.1 |
| 4,535,980 A * | 8/1985 | Jordan | B27L 7/00 | 248/156 |
| 5,492,159 A * | 2/1996 | Maloshicky | B27L 7/06 | 144/195.7 |
| 9,333,671 B2 * | 5/2016 | Huhtala | B27L 7/00 | |
| 9,643,333 B2 * | 5/2017 | Paden | B27L 7/00 | |
| 2019/0001521 A1 * | 1/2019 | Bindhammer | B27L 7/06 | |
| 2020/0206968 A1 * | 7/2020 | Seed | B27L 7/08 | |

* cited by examiner

*Primary Examiner* — Matthew Katcoff

(57) ABSTRACT

A wedge holder system and kit and method for splitting a log having a polymer foam block member with a concave top surface forming a basin with raised left and right longitudinal sides paralleling a center axis, the top surface designed to conform to a rounded side of a log. A planar bottom surface of the block member is designed to rest on a log cross section. At least one slot portion through the foam block member is designed to hold an at least one metal wedge member vertically to drive the metal wedge into a log. At least one V-shaped notch portion for holding wood vertically may be disposed within at least one exterior longitudinal side portion of the polymer foam block member. Polymer foam block members may be adjacent or coupled lengthwise or vertically.

20 Claims, 7 Drawing Sheets

WEDGE HOLDER FOR LOG SPLITTING

CLAIM OF PRIORITY

This application claims priority to and the benefit of U.S. Provisional application with Ser. No. 62/995,319, filed on Jan. 23, 2020, which is incorporated herein by reference in its entirety.

FIELD OF THE INVENTION

The inventive concept relates generally to a wedge holder for log splitting.

BACKGROUND

Many people own traditional tools for wood splitting such as wedges, axes, splitting mauls, and sledgehammers. Hand-held splitters such as axes and combinations of wedges with hammers require skill to use accurately and may endanger a the user. For example, holding a wedge by hand risks injuring that hand or the possibility that an untrue stroke of an axe could miss the target or could send chips of wood flying. Other people may use powered splitters that leverage mechanical advantages and forces more precise and more powerful than possible for a person to deliver, but these powered solutions can be expensive and may be immobile. Therefore, there is a need for an improved apparatus for assisting in safely splitting logs.

SUMMARY OF THE INVENTION

A wedge holder system for splitting a log has a compressible, substantially cuboid, polymer foam block member with a substantially concave top surface forming a basin with raised left and right longitudinal sides, the longitudinal sides substantially paralleling a center axis substantially equidistant from the longitudinal sides, the top surface designed to longitudinally rest on and conform to a rounded side of a log. A substantially planar bottom surface of the polymer foam block member is designed to rest on a horizontally disposed, substantially planar, log cross section. At least one slot portion is disposed axially centered and substantially parallel to the longitudinal sides, the at least one slot portion further disposed through the foam block from the top surface to the bottom surface and is designed to hold an at least one first wedge member substantially perpendicular to the bottom surface, the slot portion further designed to stretch without tearing to at least the maximum width of the at least one first wedge member.

In one embodiment of the wedge holder system for log splitting, at least one second slot portion is disposed axially centered and substantially parallel to the longitudinal sides, the at least one second slot portion further disposed through the polymer foam block member from the top surface to the bottom surface and designed to hold an at least one second wedge member of comparable size to the first wedge member substantially perpendicular to the bottom surface, the at least one second slot portion further designed to stretch without tearing to at least the maximum width of the at least one second wedge member, the spacing between the slot portions substantially twice the length of either the first wedge member or the at least one second wedge member.

In one embodiment of the wedge holder system for log splitting, one or more additional slot portions are disposed substantially parallel to the longitudinal sides of the polymer foam block member, the at least one additional slot portion further disposed through the polymer foam block member from the top surface to the bottom surface, each additional slot portion designed to hold wedge members of substantially different sizes from each other and the first wedge member.

In one embodiment of the wedge holder system for log splitting, at least one V-shaped notch portion is disposed within at least one exterior longitudinal side portion of the polymer foam block member designed to vertically hold a log or a partial log that the user desires to hold upright in order to split it further into smaller pieces for kindling for instance.

In one embodiment of the wedge holder system for log splitting, the at least one V-shaped notch portion is disposed with angles of substantially fifty to seventy degrees. A user could employ this embodiment to split wood portions smaller than a size one of ordinary skill in the art would recognize as a typical log, to split such smaller wood portions into still smaller sizes as might be done when making kindling.

In one embodiment of the wedge holder system for log splitting, the polymer foam block member is disposed longitudinally adjacent to at least one second polymer foam block member, each polymer foam block member coupled to at least one other polymer foam block member to form an assembly of two or more polymer foam block members, the spacing between the nearest-to-each-other adjacent slot portions disposed on each adjacent polymer foam block member substantially twice the length of the at least one first wedge member, the polymer foam block member assembly designed to split a log disposed beneath. One of ordinary skill in the art would recognize that the size of the at least one first wedge member would typically be, but is not limited to, a standard size of substantially nine inches long, substantially two to three inches wide—with substantially two and a half inches being common—and may have a taper to substantially one and three-quarter inches at a top of the at least one first or at least one second wedge member.

In one embodiment of the wedge holder system for log splitting, the polymer foam block members of the polymer foam block member assembly are slidably coupled by aligned notch portions, a soft vice afforded to logs or wedges disposed between contiguous side portions of the coupled polymer foam block members, where soft vice is defined as a mechanical device used to secure an object by putting pressure on that object from opposite side.

In one embodiment of the wedge holder system for log splitting, the polymer foam block member is a first block member disposed vertically below at least a second or one additional polymer foam block member and designed to hold a log portion disposed through vertically aligned slot portions. In one embodiment of the wedge holder system for log splitting, one or more polymer foam ridge portions are longitudinally disposed on each left and right longitudinal sides. In one embodiment of the wedge holder system for log splitting, the polymer foam block member is about five to seven inches by eleven to thirteen inches by sixteen to twenty inches in size.

A wedge holder method or process for splitting a log (which includes a log portion and a log biscuit) includes the step of using a polymer foam block member with a substantially concave top surface forming a basin with raised left and right longitudinal sides. The longitudinal sides substantially parallel a center axis substantially equidistant from the longitudinal sides, the top surface designed to longitudinally rest on and conform to a rounded side of a log. A substantially planar bottom surface of the polymer foam block member is designed to rest on a horizontally disposed, substantially planar, log cross section. At least one slot portion is disposed axially centered and substantially parallel to the longitudinal sides, the at least one slot portion further disposed through the foam block from the top surface to the bottom surface and is designed to hold an at least one first metal wedge member substantially perpendicular to the bottom surface, the slot portion further designed to stretch without tearing to at least the maximum width of the at least one first wedge member.

In one embodiment of the wedge holder process for log splitting, at least one second slot portion is disposed axially centered and substantially parallel to the longitudinal sides, the at least one second slot portion further disposed through the polymer foam block member from the top surface to the bottom surface and designed to hold an at least one second wedge member of comparable size to the first wedge member substantially perpendicular to the bottom surface, the at least one second slot portion further designed to stretch without tearing to at least the maximum width of the at least one second wedge member, the spacing between the slot portions substantially twice the length of either the first wedge member or the at least one second wedge member.

In one embodiment of the wedge holder process for log splitting, one or more additional slot portions are disposed substantially parallel to the longitudinal sides of the polymer foam block member, the at least one additional slot portion further disposed through the polymer foam block member from the top surface to the bottom surface, each additional slot portion designed to hold wedge members of substantially different sizes from each other and the first wedge member.

In one embodiment of the wedge holder process for log splitting, at least one V-shaped notch portion is disposed within at least one exterior longitudinal side portion of the polymer foam block member designed to vertically hold a log portion therein. In one embodiment of the wedge holder process for log splitting, the at least one V-shaped notch portion is disposed with angles of substantially fifty to seventy degrees.

In one embodiment of the wedge holder process for log splitting, the polymer foam block member is disposed longitudinally adjacent to at least one second polymer foam block member, each polymer foam block member coupled to at least one other polymer foam block member to form an assembly of two or more polymer foam block members, the spacing between the nearest-to-each-other adjacent slot portions disposed on each adjacent polymer foam block member substantially twice the length of the at least one first wedge member, the polymer foam block member assembly designed to split a log disposed beneath. One of ordinary skill in the art would recognize that the size of the at least one first wedge member would typically be, but is not limited to, a standard size of substantially nine inches long, substantially two to three inches wide—with substantially two and a half inches being common—and may have a taper to substantially one and three-quarter inches at a top of the at least one first or at least one second wedge member.

In one embodiment of the wedge holder process for log splitting, the polymer foam block members of the polymer foam block member assembly are slidably coupled by aligned notch portions, a soft vice afforded to logs or wedges disposed between contiguous side portions of the coupled polymer foam block members.

In one embodiment of the wedge holder process for log splitting, wherein the polymer foam block member is disposed vertically below at least one additional polymer foam block member and designed to hold a log portion disposed through vertically aligned slot portions. In one embodiment of the wedge holder process for log splitting, one or more polymer foam ridge portions are longitudinally disposed on each left and right longitudinal sides. In one embodiment of the wedge holder process for log splitting, the polymer foam block member is about five to seven inches by eleven to thirteen inches by sixteen to twenty inches in size.

In a related embodiment, a log splitting kit is provided that includes a wedge holder member having a top surface with a concave portion and a bottom planar surface, the wedge holder member comprised of a polymer foam and including at least one slot portion formed vertically through the wedge holder member from the top surface to the bottom surface. The kit further provides a metal wedge member having a substantial triangular shape or configuration with a flat head portion and a tip portion, wherein the metal wedge member is adapted to be inserted vertically through and supported upright by the at least one slot portion of the wedge holder member.

The inventive concept is made from a polymer foam or sponge which, in one embodiment, is about six by twelve by eighteen inches in size. Other sizes may be used. The inventive concept is designed to act as a guide for placement of steel or other metal wedges to split wood when the wedges are pounded into logs. The embodiment described is optimized for logs of the size commonly burned in fireplaces, wood burning stoves, campfires, and such. The polymer foam block member is tough, resilient, returns to shape, and is light weight, meaning easy for an ordinary person to carry. The polymer foam block member stores easily, requires minimal maintenance, and resists destruction. One of ordinary skill in the art would recognize that tough, resilient, and other words generally describing robustness means to be able to withstand rough surfaces as might appear on a log and to resist the stretching and pounding associated with driving a wedge where parts of that wedge are in contact with surfaces of the polymer foam block member. The polymer foam block member holds wedges in a predetermined place to be pounded into the wood with a hammer. Shaped slots in the polymer foam block member allow various shaped and sized wedges to pass through the polymer foam block member with only enough friction as required to hold the wedges temporarily in place until set into the wood. When the wedges are set into the wood by about one-third of the length of the wedges, the polymer foam block member has served its purpose and can be removed and set aside so that the polymer foam block member is not subjected to wear.

One or more wedges can be positioned in the polymer foam block member. An advantage of using two or more wedges at the same time on larger wood pieces is that when the wedges are linearly aligned and spaced apart, the fracturing spreads outward between wedges and is shared between wedges. This sharing of fracturing improves splitting efficiency by reducing physical effort and may take less time than when using a single wedge. The shared forces are in communication.

The polymer foam block member can work on log biscuits, meaning a log section where the diameter of the log is wider than the side of the log is long. The polymer foam block member can work on logs lying on the ground. Oftentimes, uneven ends prevent logs from standing up for splitting. A notch or soft vice is provided to safely hold pieces of wood to be split into kindling. The polymer foam block member is flexible, and as such, can hold various shapes of wood and be used in the manner of a soft vice allowing its walls to be spread open, wood to be placed between walls, and the walls returned to grip the wood.

The polymer foam block member is designed to be safer for a user than holding a wedge by hand, reducing the danger of injuring a hand, amputating fingers, or other physical harm, when setting wedges or splitting kindling. The polymer foam block member assists gripping wood to be split down to size for burning. When placed by hands, the polymer foam block member self-centers lengthwise on top of logs laying on the ground due to the channeling of its concave surface. The friction from the leading edges of the longitudinal sides, also referred to as stairsteps inside the channeling, allow a more stable grip against logs of various diameters to prevent the polymer foam block member from rolling off. The wedges remain upright to be pounded into the wood with hammers. The incremental additional weight of wedges add stability to the polymer foam block member guide prior to pounding the wedges with hammer tools. Wedges are removed when a log is split and can be reused or repositioned to continue splitting.

The user places the polymer foam block member on a log and inserts a wedge into the one or more slots disposed substantially along the center axis of the polymer foam block member. The wedges are spaced apart, the slots only large enough to hold wedges in place, as would be recognized by a person of ordinary skill in the art, through the friction of the polymer foam closing around the wedge. Because a continuous slot in between multiple wedges would be too weak to hold wedges in place, the foam between the slots remains intact. In one embodiment, the space between interlocked wedges is that of the length of the wedge doubled. As an example, a two-and-a-half-inch wedge should have an open space of five inches between it and an adjacent wedge. The distance repeats the same spacing for additional segments where three or more slots are then included. The space between wedges is somewhat predetermined but is not limited thereto since segments can be placed independently of each other in various places as determined by the user, for example, alongside each other. Wedges can be inserted in either direction through the polymer foam block member, defined here as through the top concave surface or bottom substantially flat surface, depending on the appropriate function.

Wedges pointed and driven into wood logs exert constant force causing the log to split, which offers a distinct advantage over an axe that is withdrawn after a stroke, thereby removing the force of splitting. The wedge is a fixed target and often easier to hit accurately with a hammer when compared to swinging an axe accurately to re-enter the small narrow cut made by the axe over repeated strokes. The polymer foam block member slots which hold the wedges have another function in that small wood can be placed in them for the purpose of making kindling.

Wedges placed in communication, linear alignment, are less likely to become stuck in a stubborn log as they tend to relive one another. Removal, reuse, and repositioning wedges becomes physically easier with the inventive concept. Located in the channel, in one embodiment, are stair stepping ridges running lengthwise from end to end. Stair stepping ridges provide a better grip on logs of various diameters, which are usually laying horizontally on the ground. The ledging edges provide a targeted grip which reduces rotational slippage of the polymer foam block member on round logs of various diameters.

Segmented interlocking guides may be used alone or more can be added and interconnected to a length the user deems necessary as one of ordinary skill in the art might compare to Lego blocks. Additional embodiments include joining together vertical shapes along the vertical outer edge that could be designated soft vertical vices in which the segments can be manually spread apart, small wood vertically inserted and held in place for splitting with an axe without endangering the user's hands. In one embodiment, a bevel of approximately fifty to seventy degrees along one outer edge on each segment, when placed together, form an angled opening aiding the insertion of wood into the vice.

The space above the channel remains sufficiently thick enough to properly support the wedges in ready-to-strike positions. One of ordinary skill in the art would recognize that the thickness required depends on the length of the wedge and the compressive force induced by the polymer foam block member and that a thickness of about one quarter to one third of the length of the wedge is used in at least one embodiment.

The polymer foam block member is self-supporting and does not have a framework. When segments are interconnected, a soft vice becomes available. If one side of a given two segments remain disconnected, it may allow the segments to become manually splayed apart to form a V shape, allowing a kindling notch to become available to hold a piece of wood in a vertical position to be split into thin strips for kindling. Segments interlock and stay together with friction. They may be slidably assembled or slidably disconnected.

Among other things, it is an advantage of the wedge holder for splitting a log to provide a log splitter that does not suffer from problems or deficiencies associated with prior solutions.

It is still further an advantage of the wedge holder for splitting a log to be portable, and to be free standing without a frame assembly. The wedge holder for splitting a log is, therefore, is not limited to logs of a particular size. This inventive concept may be offered in a variety of colors.

The inventive concept now will be described more fully hereinafter with reference to the accompanying drawings, which are intended to be read in conjunction with both this summary, the detailed description and any preferred and/or particular embodiments specifically discussed or otherwise disclosed. This inventive concept may, however, be embodied in many different forms and should not be construed as limited to the embodiments set forth herein; rather, these embodiments are provided by way of illustration only and so that this disclosure will be thorough, complete, and will fully convey the full scope of the inventive concept to those skilled in the art.

DETAILED DESCRIPTION OF THE INVENTION

Figure 1A:
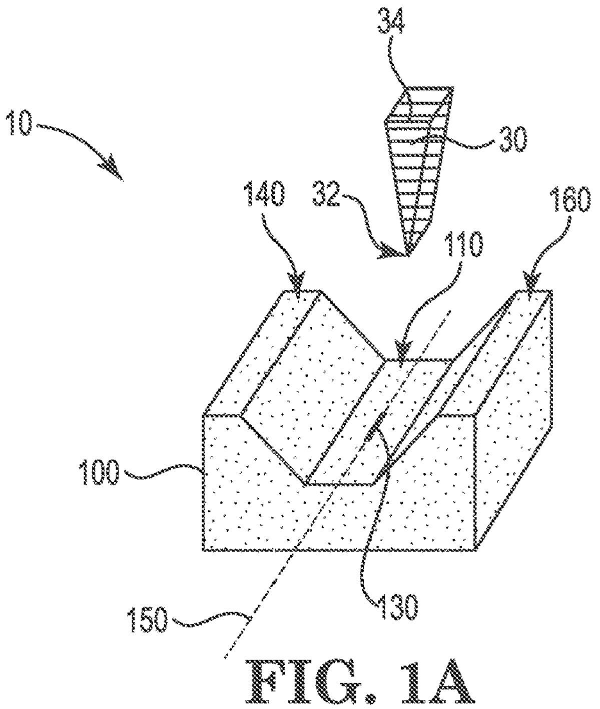
FIG. 1A illustrates a perspective view of the polymer foam block member and a wedge member used to protrude through the foam block member.

Following are more detailed descriptions of various related concepts related to, and embodiments of, methods and apparatus according to the present disclosure. It should be appreciated that various aspects of the subject matter introduced above and discussed in greater detail below may be implemented in any of numerous ways, as the subject matter is not limited to any particular manner of implementation. Examples of specific implementations and applications are provided primarily for illustrative purposes.

Referring to the figures and to which is included here in its entirety, FIGS. 1A-1E illustrate a wedge holder kit 10 for splitting a log that has a compressible, substantially cuboid, polymer foam block member 100 with a substantially concave top surface 110 forming a basin with raised left longitudinal side 140 and right longitudinal side 160, the longitudinal sides substantially paralleling a center axis substantially equidistant from the longitudinal sides 150. In this example embodiment, wedge holder kit 10 includes a metal wedge member 30, which includes a sharp or wedge tip 32, and a flat head portion 34 for striking with a hammer, used to drive into a log or wood piece and split it. Wedge member 30 can be of various sizes and wedge angles depending on the size of log or wood to be split. Although not shown, wedge holder kit 10 also includes a hammer or sledgehammer for bigger logs to strike head 34 and drive it through slit 130 and into a log.

Figure 1B:
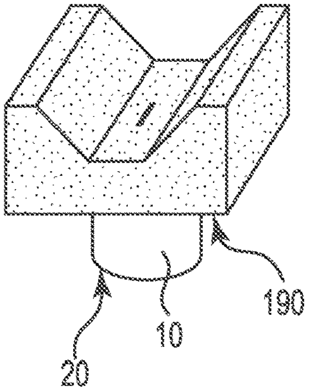
FIG. 1B illustrates a perspective view of the foam block member located on a top cross section of a log to be split.
Figure 1C:
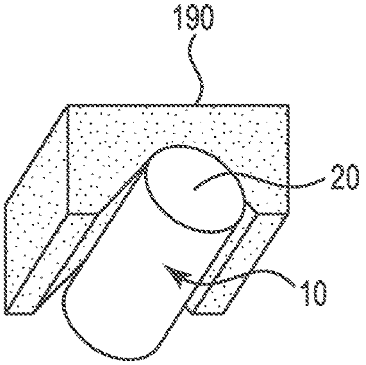
FIG. 1C illustrates a perspective view of the foam block member disposed longitudinally a log to be split located adjacent a top surface of the foam block member.
Figure 1D:
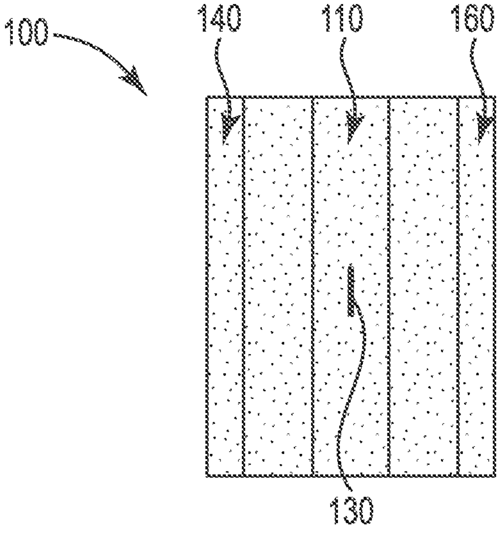
FIG. 1D illustrates the top view of the polymer foam block member.
Figure 1E:
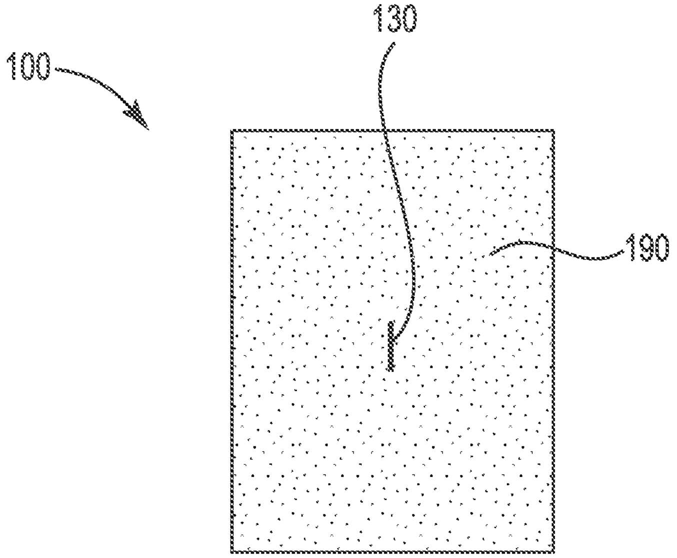
FIG. 1E illustrates the bottom view of the polymer foam block member.

Referring to FIG. 1C, the top surface 110 of foam block member 100 is designed to longitudinally rest on and conform to a rounded side of a log 20. In this way, log 20 is split longitudinally or lengthwise. FIGS. 1D and 1E illustrate top and bottom views of foam block member 100 with slot or slit 130 for which wedge 30 protrudes therethrough.

In a related embodiment illustrated in FIG. 1B, a substantially planar bottom surface 190 of the polymer foam block member 100 is designed to rest on a horizontally disposed, substantially planar, log cross section 20A of log 20. At least one slot portion 130 is disposed axially centered and substantially parallel to the longitudinal sides, the at least one slot portion 130 further disposed through the foam block 100 from the top surface 110 to the bottom surface 190 and is designed to hold an at least one first wedge member 30 substantially perpendicular to the bottom surface 190, the slot portion 130 further designed to stretch without tearing to at least the maximum width of the at least one first wedge member 30. In another related embodiment, foam block member 100 includes an indentation on surface 190 to facilitate locating foam block member on cross section 20A of log 20.

Figure 2A:
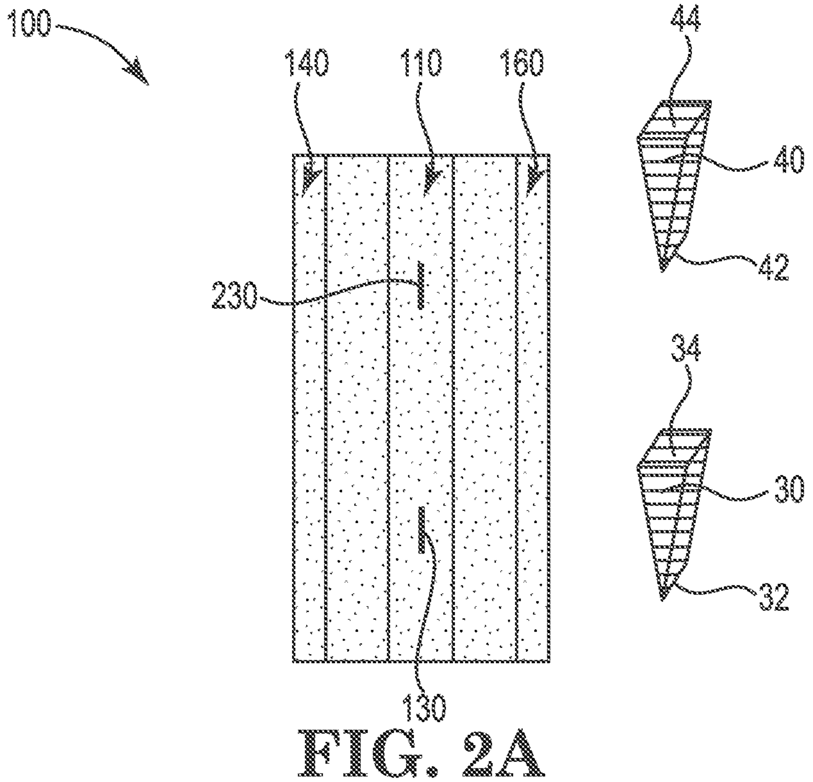
FIG. 2A illustrates a top view of the polymer foam block member with two equally sized slot members.
Figure 2B:
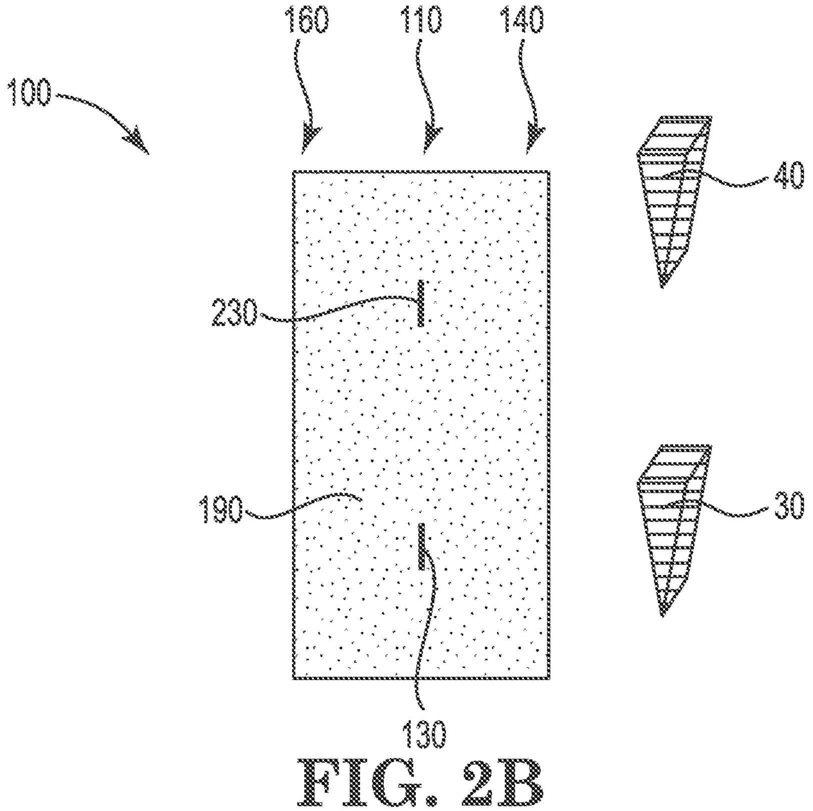
FIG. 2B illustrates a bottom view of the polymer foam block member with two equally sized slot members.

FIG. 2A-2B illustrates one embodiment of the wedge holder kit 10 for longer log splitting, which includes at least one second slot or slit portion 230 is disposed axially centered and substantially parallel to the longitudinal sides 140, 160, the at least one second slot portion 230 further disposed through the polymer foam block member 100 from the top surface 110 to the bottom surface 190 and designed to hold an at least one second wedge member 40 (having a wedge tip 42 and flat head 44) of comparable size to the first wedge member 30 substantially perpendicular to the bottom surface 190, the at least one second slot portion 230 further designed to stretch without tearing to at least the maximum width of the at least one second wedge member 40, the spacing between the slot portions substantially twice the length of either the first wedge member 30 or the at least one second wedge member 40.

Figure 3A:
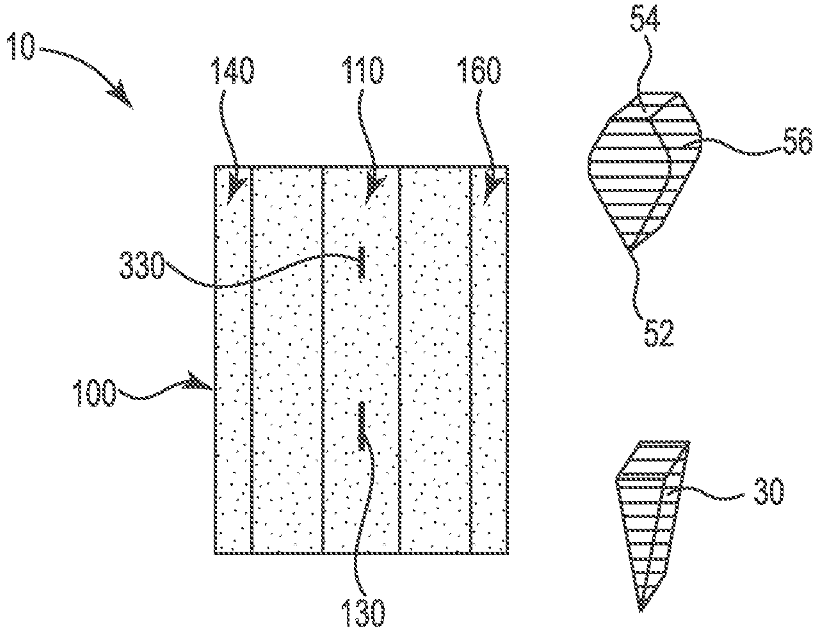
FIGS. 3A and 3B illustrate top and bottom views, respectively, of the polymer foam block member with two differently sized slot members.
Figure 3B:
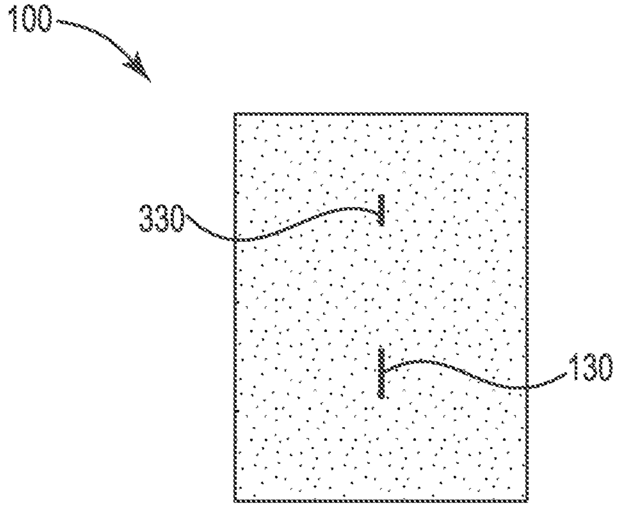

FIGS. 3A and 3B illustrate one embodiment of the wedge holder kit 10 for splitting a log wherein one or more additional slot portions 330 are disposed substantially parallel to the longitudinal sides of, with reference to FIG. 1A, the polymer foam block member 100 with sides 140, 160, the at least one additional slot portion 330 further disposed through the polymer foam block member 100 from the top surface 110 to the bottom surface 190, each additional slot portion 330 designed to hold an additional wedge member (or members) 50 of substantially different sizes from each other and the first wedge member 30. In this example embodiment, wedge member 50 includes a wedge tip 52, a flat head 54 and a bulbous midportion 56 to facilitate log-splitting.

Figure 4:
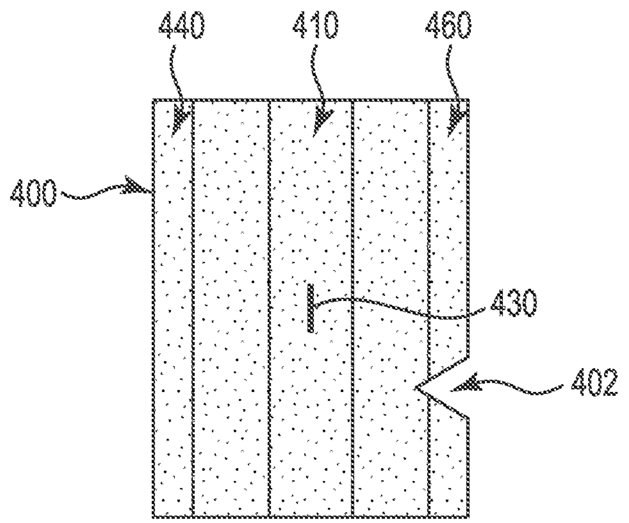
FIG. 4 illustrates a view of the polymer foam block member with one V-shaped notch portion.

FIG. 4 illustrates one embodiment of the wedge holder foam block 400 for splitting a log (or a partial log) that the user desires to hold upright in order to split it further into smaller pieces for kindling for example. In this embodiment, the foam block member 400 includes a center portion 410 and two longitudinal sides 440 and 460 and a slit 430. The at least one V-shaped notch portion 402 is disposed within at least one exterior longitudinal side portion of, with reference to FIG. 1A, the polymer foam block member 140, 160 designed to vertically hold a log portion therein. In one embodiment of the wedge holder for log splitting, the at least one V-shaped notch portion 402 is disposed with angles of substantially fifty to seventy degrees.

Figure 5A:
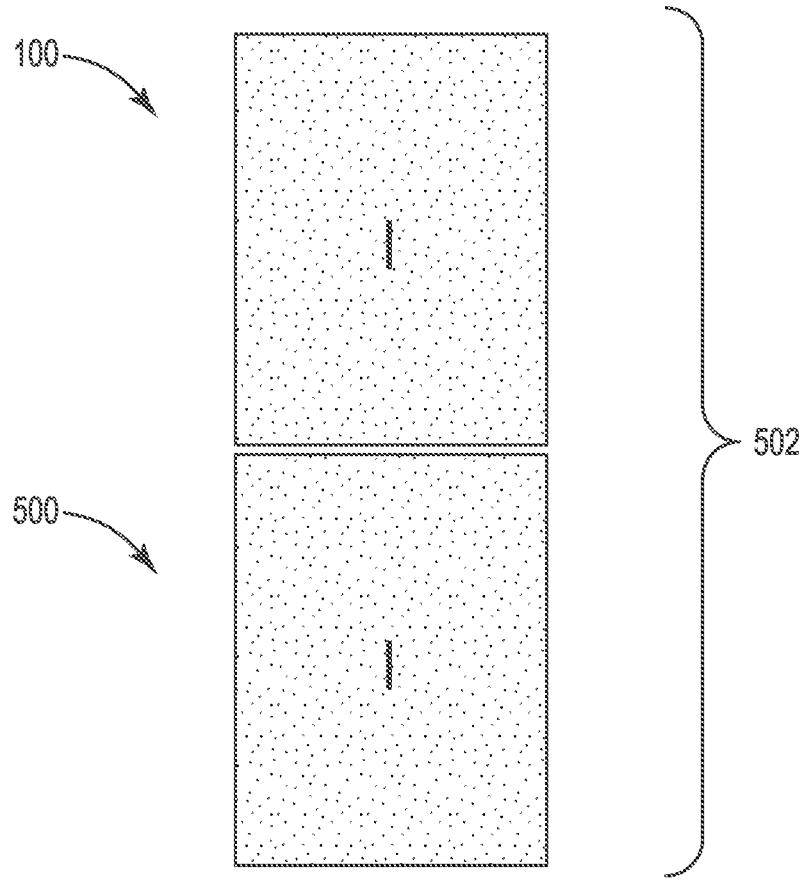
FIG. 5A illustrates a bottom side view of the polymer foam block member and the second polymer foam block member.

FIG. 5A illustrates one embodiment of the wedge holder for log splitting, with reference to FIG. 1, the polymer foam block member 100 is disposed longitudinally adjacent to at least one second polymer foam block member 500, each polymer foam block member 100, 500 coupled to at least one other polymer foam block member 100, 500 to form an assembly of two or more polymer foam block members 502, the spacing between the nearest-to-each-other adjacent slot portions 130 disposed on each adjacent polymer foam block member 100, 500 substantially twice the length of the at least one first wedge member 30, the polymer foam block member assembly 502 designed to split a log disposed beneath.

Figure 5B:
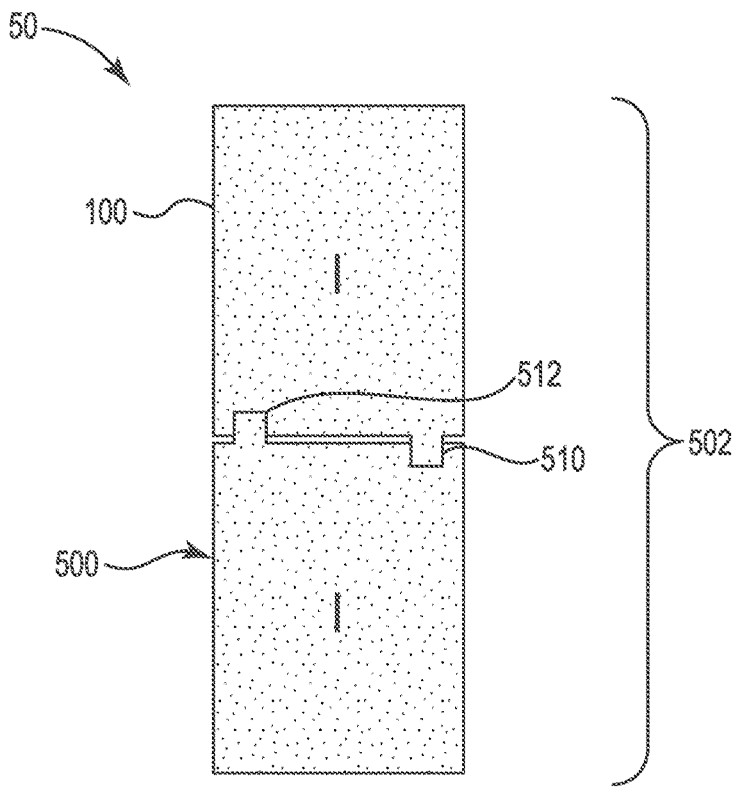
FIG. 5B illustrates a bottom side view of the polymer foam block member and the additional polymer foam block member wherein the polymer foam block members are slidably coupled.

FIG. 5B illustrates one embodiment of the wedge holder kit 50 for log splitting, with reference to FIG. 1A, the polymer foam block members 100, 500 of the polymer foam block member assembly 502 are slidably coupled by interlocking and aligned notch portions 510 and tabs 512 for longer log pieces that need splitting.

Figure 6:
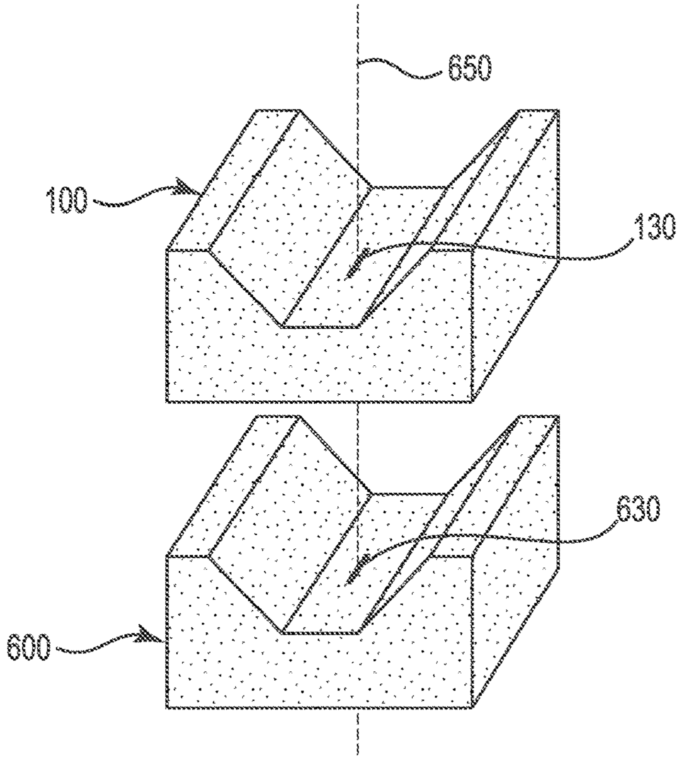
FIG. 6 illustrates a perspective view of two polymer foam block members vertically adjacent with aligned slots.

FIG. 6 illustrates one embodiment of the wedge holder assembly for log splitting, wherein, with reference to FIG. 1A, the polymer foam block member 100 is disposed vertically above at least one additional polymer foam block member 600 and designed to hold a log portion disposed through vertically aligned slot portions 130 and 630 along a longitudinal axis 650.

Figure 7:
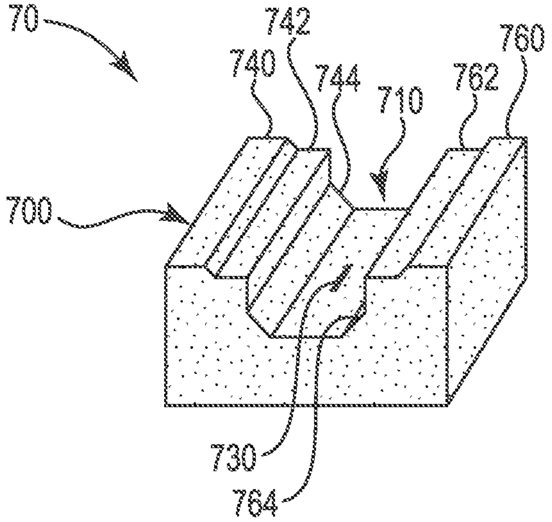
FIG. 7 illustrates a perspective view of the polymer foam block member one ridge portion disposed on one side portion of the polymer foam block member.

FIG. 7 illustrates one embodiment of the wedge holder 70 for log splitting wherein one or more polymer left foam ridge portions 740, 742 and 744 and right foam ridge portions 760, 762 and 764 are longitudinally disposed on each left and right longitudinal sides of, with reference to FIG. 1A, the polymer foam block members 740, 760. The plurality of ridge portions described above facilitate splitting logs of various diameters on foam block 700 via slot or slit 730.

Figure 8:
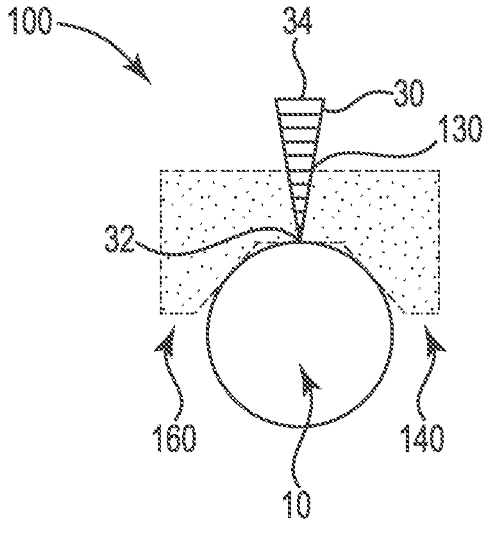
FIG. 8 a side view of the foam block member (in phantom view, dotted lines) disposed longitudinally over a log to be split located adjacent a top surface of the foam block member.

FIG. 8 illustrates use of a metal wedge 30 inside the slot portion 130 within the polymer foam block member 100 (in phantom view, dotted lines for improved viewing of wedge movement through the foam block member 130) for slitting an exemplary log 20 upon striking of head 34 with a hammer.

The following patents are incorporated by reference in their entireties: U.S. Pat. Nos. 7,762,914; 10,232,229, and 10,610,742.

While the inventive concept has been described above in terms of specific embodiments, it is to be understood that the inventive concept is not limited to these disclosed embodiments. Upon reading the teachings of this disclosure, many modifications and other embodiments of the inventive concept will come to mind of those skilled in the art to which this inventive concept pertains, and which are intended to be and are covered by both this disclosure and the appended claims. It is indeed intended that the scope of the inventive concept should be determined by proper interpretation and construction of the appended claims and their legal equivalents, as understood by those of skill in the art relying upon the disclosure in this specification and the attached drawings.

The invention claimed is:

1. A wedge holder system for splitting a log using at least one metal wedge member, the wedge holder system comprising:

a compressible, substantially cuboid, polymer foam block member with a substantially concave top surface forming a basin with raised left and right longitudinal sides, the longitudinal sides substantially paralleling a center axis substantially equidistant from the longitudinal sides, the top surface adapted to longitudinally rest on and conform to a rounded side of a log;

a substantially planar bottom surface of the polymer foam block member adapted to rest on a horizontally disposed, substantially planar, log cross section; and at least one slot portion disposed axially centered and substantially parallel to the longitudinal sides, the at least one slot portion further disposed through the foam block from the top surface to a bottom surface and adapted to hold an at least one first wedge member substantially perpendicular to the bottom surface, the slot portion further adapted to stretch without tearing to at least the maximum width of the at least one first wedge member.

2. The wedge holder system for splitting a log of claim 1 wherein at least one second slot portion is disposed axially centered and substantially parallel to the longitudinal sides, the at least one second slot portion further disposed through the polymer foam block member from the top surface to the bottom surface and adapted to hold an at least one second wedge member of comparable size to the first wedge member substantially perpendicular to the bottom surface, the at least one second slot portion further adapted to stretch without tearing to at least the maximum width of the at least one second wedge member, the spacing between the slot portions substantially twice the length of either the first wedge member or the at least one second wedge member.

3. The wedge holder system for splitting a log of claim 1 wherein one or more additional slot portions are disposed substantially parallel to the longitudinal sides of the polymer foam block member, the at least one additional slot portion further disposed through the polymer foam block member from the top surface to the bottom surface, each additional slot portion adapted to hold wedge members of substantially different sizes from each other and the first wedge member.

4. The wedge holder system for splitting a log of claim 1 wherein at least one V-shaped notch portion is disposed within at least one exterior longitudinal side portion of the polymer foam block member adapted to vertically hold a log portion therein.

5. The wedge holder system for splitting a log of claim 4 wherein the at least one V-shaped notch portion is disposed with angles of substantially fifty to seventy degrees.

6. The wedge holder system for splitting a log of claim 1 wherein the polymer foam block member is a first wedge block member disposed longitudinally adjacent to at least a second polymer foam block member, each polymer foam block member coupled to at least one other polymer foam block member to form an assembly of two or more polymer foam block members, the spacing between the nearest-to-each-other adjacent slot portions disposed on each adjacent polymer foam block member substantially twice the length of the at least one first wedge block member, the polymer foam block member assembly adapted to split a log disposed beneath.

7. The wedge holder system for splitting a log of claim 6 wherein the polymer foam block members of the polymer foam block member assembly are slidably coupled by aligned notch portions, a soft vice afforded to logs or wedges disposed between contiguous side portions of the coupled polymer foam block members.

8. The wedge holder system for splitting a log of claim 1 wherein the polymer foam block member is disposed vertically below at least one second polymer foam block member and adapted to hold a log portion disposed through vertically aligned slot portions.

9. The wedge holder system for splitting a log of claim 1 wherein one or more polymer foam ridge portions are longitudinally disposed on each left and right longitudinal sides of the polymer foam block member.

10. The wedge holder system for splitting a log of claim 1 wherein the polymer foam block member is about five to seven inches by eleven to thirteen inches by sixteen to twenty inches in size.

11. A method or process for splitting a log member using a metal wedge member comprising:

utilizing a compressible, substantially cuboid, polymer foam block member with a substantially concave top surface forming a basin with raised left and right longitudinal sides, the longitudinal sides substantially paralleling a center axis substantially equidistant from the longitudinal sides, the top surface adapted to longitudinally rest on and conform to a rounded side of the log member, the log member including at least one log, a log portion or a log biscuit;

locating a substantially planar bottom surface of the polymer foam block member on a horizontally disposed or upright, substantially planar, log cross section; and providing for at least one slot portion disposed axially centered and substantially parallel to the longitudinal sides, the at least one slot portion being disposed through the foam block from the top surface to the bottom surface to hold an at least one first wedge member substantially perpendicular to the bottom surface, the slot portion further adapted to stretch without tearing to at least the maximum width of the at least one first wedge member.

12. The method of splitting a log of claim 11 further comprising the step of providing at least one second slot portion is disposed axially centered and substantially parallel to the longitudinal sides of the polymer foam block member, the at least one second slot portion further disposed through the polymer foam block member from the top surface to the bottom surface and adapted to hold an at least one second wedge member of comparable size to the first wedge member substantially perpendicular to the bottom surface, the at least one second slot portion further adapted to stretch without tearing to at least the maximum width of the at least one second wedge member, the spacing between the slot portions substantially twice the length of either the first wedge member or the at least one second wedge member.

13. The method of splitting a log of claim 11 further comprising the step of providing one or more additional slot portions are disposed substantially parallel to the longitudinal sides of the polymer foam block member, the at least one additional slot portion further disposed through the polymer foam block member from the top surface to the bottom surface, each additional slot portion adapted to hold wedge members of substantially different sizes from each other and the first wedge member.

14. The method of splitting a log of claim 11 further comprising the step of forming at least one V-shaped notch portion is disposed within at least one exterior longitudinal side portion of the polymer foam block member adapted to vertically hold a log portion therein.

15. The wedge holder process for splitting a log of claim 14 wherein the at least one V-shaped notch portion is disposed with angles of substantially fifty to seventy degrees.

16. The wedge holder process for splitting a log of claim 11 wherein the polymer foam block member is disposed longitudinally adjacent to at least one additional polymer foam block member, each polymer foam block member coupled to at least one other polymer foam block member to form an assembly of two or more polymer foam block members, the spacing between the nearest-to-each-other adjacent slot portions disposed on each adjacent polymer foam block member substantially twice the length of the at least one first wedge member, the polymer foam block member assembly adapted to split a log disposed beneath.

17. The wedge holder process for splitting a log of claim 16 wherein the polymer foam block members of the polymer foam block member assembly are slidably coupled by aligned notch portions, a soft vice afforded to logs or wedges disposed between contiguous side portions of the coupled polymer foam block members.

18. A log splitting kit comprising:

a wedge holder member having a top surface with a concave portion and a bottom planar surface, the wedge holder member comprised of a polymer foam and including at least one slot portion formed vertically through the wedge holder member from the top surface to the bottom surface; and a metal wedge member having a substantial triangular shape or configuration with a flat head portion and a tip portion, wherein the wedge member is adapted to be inserted vertically through and supported upright by the at least one slot portion of the wedge holder member.

19. The log splitting kit of claim 18 wherein the concave portion of the top surface of the wedge holder member is configured from at least one set of polymer foam ridge portions longitudinally disposed on each left and right longitudinal sides of the polymer foam block member.

20. The log splitting kit of claim 18 further comprising a wedge holder member including a second concave or indented portion adapted to allow the wedge holder member to be located on a cross section or longitudinal end of a log member.

* * * * *